United States Patent
Jung (10) Patent No.: US 9,022,009 B2
(45) Date of Patent: May 5, 2015

(54) APPARATUS AND METHOD FOR CONTROL LOW PRESSURE EXHAUST GAS RECIRCULATION SYSTEM

(75) Inventor: Jae Yoon Jung, Yongin (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 932 days.

(21) Appl. No.: 13/180,356

(22) Filed: Jul. 11, 2011

(65) Prior Publication Data

US 2012/0012088 A1  Jan. 19, 2012

(30) Foreign Application Priority Data

Jul. 16, 2010  (KR) .................. 10-2010-0068928

(51) Int. Cl.
| | |
|---|---|
| F02B 47/08 | (2006.01) |
| F02M 25/07 | (2006.01) |
| B60T 7/12 | (2006.01) |
| G05D 1/00 | (2006.01) |
| G06F 7/00 | (2006.01) |
| G06F 17/00 | (2006.01) |
| F02D 29/02 | (2006.01) |
| F02D 41/00 | (2006.01) |
| F02B 29/04 | (2006.01) |

(52) U.S. Cl.
CPC ........... *F02M 25/0709* (2013.01); *F02D 29/02* (2013.01); *F02D 41/0065* (2013.01); *F02M 25/074* (2013.01); *F02B 29/0406* (2013.01); *F02D 2200/0418* (2013.01); *F02D 2200/70* (2013.01); *F02D 2200/701* (2013.01); *F02M 25/0707* (2013.01); *F02M 25/0718* (2013.01); *F02M 25/0732* (2013.01); *Y02T 10/47* (2013.01)

(58) Field of Classification Search
CPC ........... Y02T 10/47; F02D 2200/0418; F02D 41/005; F02D 2200/0414; F02D 41/0065; F02D 41/0072; F02M 25/0754; F02M 25/0738
USPC ................ 123/568.22, 568.31; 701/102, 108; 60/278, 605.2; 73/114.74
See application file for complete search history.

(56) References Cited

U.S. PATENT DOCUMENTS

| | | | | |
|---|---|---|---|---|
| 5,520,594 | A | * | 5/1996 | Fukasawa et al. ............. 477/173 |
| 6,009,851 | A | * | 1/2000 | Iida et al. .................. 123/339.12 |
| 6,301,887 | B1 | | 10/2001 | Gorel et al. |

(Continued)

FOREIGN PATENT DOCUMENTS

| | | |
|---|---|---|
| JP | 8-29511 A | 2/1996 |
| JP | 8-144804 A | 6/1996 |

(Continued)

*Primary Examiner* — Mahmoud Gimie
*Assistant Examiner* — Sizo Vilakazi
(74) *Attorney, Agent, or Firm* — Morgan, Lewis & Bockius LLP (57) ABSTRACT

A low pressure EGR (Exhaust Gas Recirculation) system control apparatus of an internal combustion engine of a vehicle may include an atmosphere temperature detecting portion that detects atmosphere temperature of a driving region of the vehicle, an air conditioner switch that outputs ON/OFF signal of an air conditioner, a wiper switch outputting ON/OFF signal of a wiper, a control portion that uses the atmosphere temperature to determine a relative humidity and limits an operation of a low pressure EGR system such that condensate may be not formed therein, when the relative humidity may be higher than a predetermined humidity value.

5 Claims, 7 Drawing Sheets

(56) References Cited

U.S. PATENT DOCUMENTS

| | | | |
|---|---|---|---|
| 7,275,525 B2 * | 10/2007 | Miyasako et al. | 123/568.16 |
| 2003/0114978 A1 * | 6/2003 | Rimnac et al. | 701/108 |
| 2003/0192516 A1 * | 10/2003 | Brunemann et al. | 123/568.12 |
| 2005/0021217 A1 * | 1/2005 | Bhargava et al. | 701/108 |
| 2007/0239344 A1 * | 10/2007 | Durand | 701/108 |
| 2008/0167791 A1 * | 7/2008 | Fulton et al. | 701/108 |
| 2012/0024271 A1 * | 2/2012 | Pasero et al. | 123/568.22 |
| 2012/0227719 A1 * | 9/2012 | Surnilla et al. | 123/676 |

FOREIGN PATENT DOCUMENTS

| | | |
|---|---|---|
| JP | 2008-2351 A | 1/2008 |
| JP | 2009-174444 A | 8/2009 |
| JP | 2010-223179 A | 10/2010 |
| KR | 10-2010-0064880 A | 6/2010 |

* cited by examiner

APPARATUS AND METHOD FOR CONTROL LOW PRESSURE EXHAUST GAS RECIRCULATION SYSTEM

CROSS-REFERENCE TO RELATED APPLICATION

The present application claims priority to Korean Patent Application No. 10-2010-0068928 filed in the Korean Intellectual Property Office on Jul. 16, 2010, the entire contents of which is incorporated herein for all purposes by this reference.

BACKGROUND OF THE INVENTION

1. Field of the Invention

The present invention relates to a low pressure EGR system control apparatus that calculates a relative humidity from an atmosphere temperature and determines whether humidity is high or not according to a driver's driving behavior to limit an operation of a low pressure EGR system and the method thereof.

2. Description of Related Art

An internal combustion engine is provided with an exhaust gas recirculation (EGR) system that recirculates a part of an exhaust gas into an intake system such that a temperature of burning gas in the combustion chamber can be lowered so as to reduce the generation of NOx.

Figure 1:
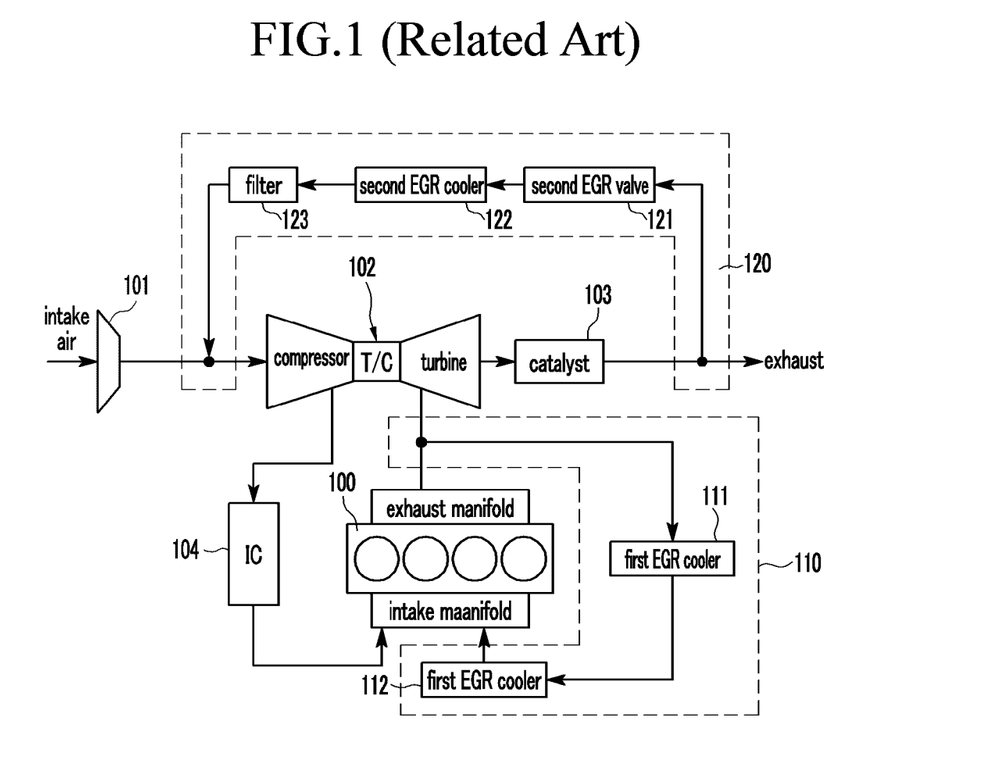
FIG. 1 is a drawing showing an EGR system that is disposed in an internal combustion engine.

FIG. 1 is a drawing showing an EGR system that is disposed in an internal combustion engine.

As shown in FIG. 1, a high pressure EGR system recirculates an upstream side exhaust gas of a turbocharger 102 that is connected to an exhaust manifold of an engine 100 to an intake system and a low pressure EGR system 120 recirculates an downstream side exhaust gas of a catalyst 103 to an upstream side of a compressor.

The high pressure EGR system 110 is duty controlled according to a driving condition of the engine 100 to include a first EGR valve 111 that controls a flow rate of an upstream side exhaust gas of a turbo charger 102 and a first EGR cooler 112 that cools a recirculated exhaust gas passing the first EGR valve 111, and the cooled recirculated exhaust gas is supplied to an intake manifold.

Also, the low pressure EGR system 120 is duty controlled according to a driving condition of the engine 100, includes a second EGR valve 121 that controls a recirculated flow rate of an downstream side exhaust gas of a catalyst 103, a second EGR cooler 122 that cools exhaust gas flowing through the first EGR valve 121, and a filter 123.

The low pressure EGR system 120 recirculates a downstream side exhaust gas of a turbocharger 102 and supplies a larger amount of exhaust gas without deteriorating a turbe efficiency in a high load/speed driving condition to reduce NOx and fuel consumption.

However, the low pressure EGR system forms condensate in a heat exchanging process that the recirculated exhaust gas passes the EGR cooler and the intercooler and the condensate amount is determined as follows.

The condensate generation amount=vapor amount included in exhaust gas(g)−saturated steam amount in a dropped temperature (g/m$^3$)×exhaust gas flow rate (m$^3$)

Figure 2:
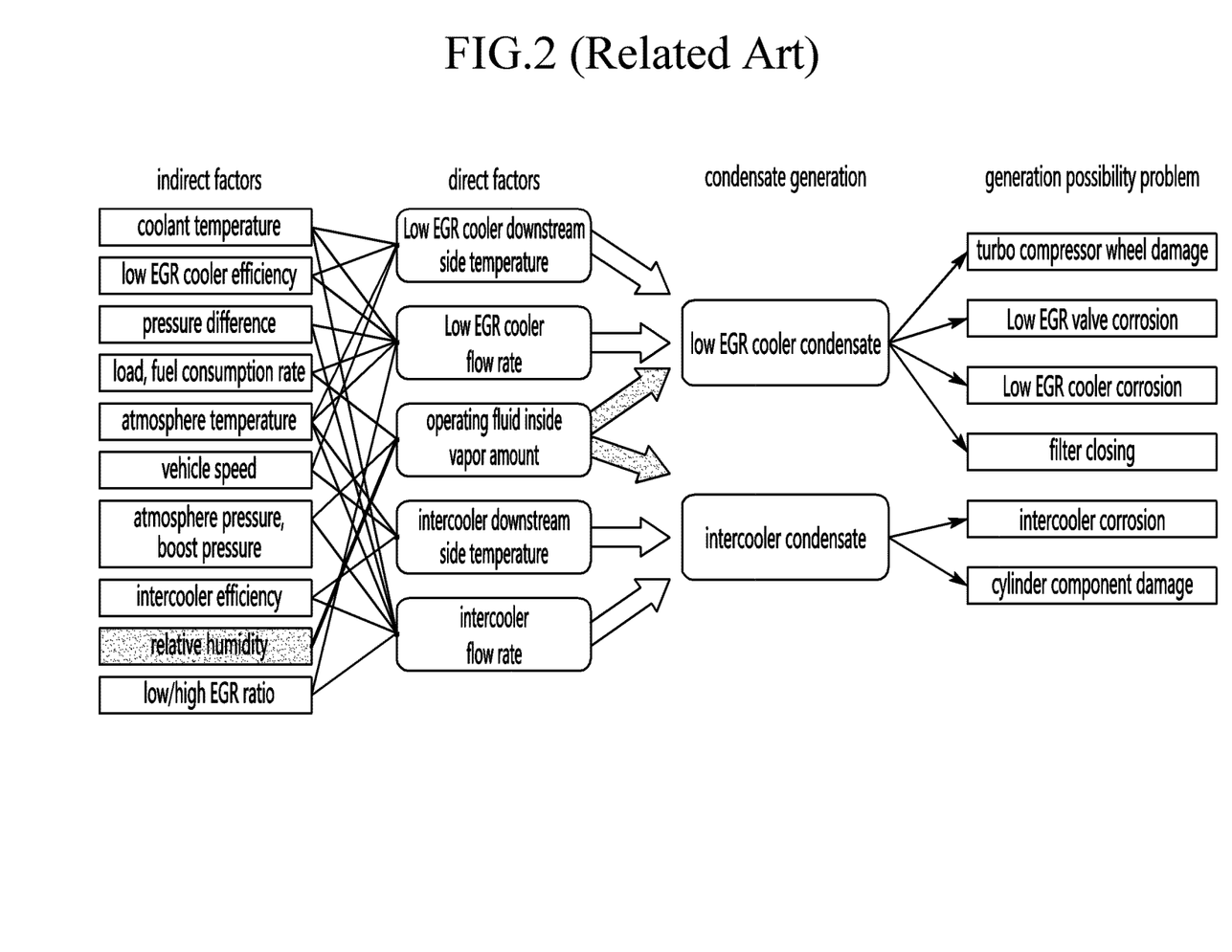
FIG. 2 is a drawing showing a condensate generation factor and a problem thereof in a low pressure EGR system.

FIG. 2 is a drawing showing a condensate generation factor and a problem thereof in a low pressure EGR system.

As shown in FIG. 2, factors that indirect affects a condensate generation in a low pressure EGR system includes a coolant temperature, a low pressure EGR cooler efficiency, a pressure difference, a load, a fuel consumption amount, an atmosphere temperature, a vehicle speed, an atmospheric pressure, a boost pressure, in intercooler efficiency, a relative humidity, an EGR ratio of a low pressure side and a high pressure, etc.

And, factors that direct affects a condensate generation includes a downstream side temperature of a low pressure EGR cooler, an exhaust gas flow rate of a low pressure EGR cooler, a vapor amount of an operating fluid, a downstream side temperature of an intercooler, an intercooler passing flow rate, etc that are affected by the indirect factors.

Accordingly, a condensate is generated in a low pressure EGR cooler by the indirect factors and the direct factors.

The condensate that is formed in the low pressure EGR cooler damages a compressor wheel of a turbocharger, corrodes a low pressure EGR valve and a low pressure EGR cooler, and closes a filter.

And, the condensate that is formed in the intercooler corrodes the intercooler and can damages components around a combustion chamber.

The condensate that is formed in an intercooler is stored in a reservoir tank, if the condensate reaches a predetermined level, an electric valve is automatically operated to exhaust the condensate in an U.S. Pat. No. 6,301,887.

Also, an exhaust passage is formed in a low pressure EGR cooler to exhaust condensate in a Japanese Patent Laid-Open Publication No. (JP2008-002351) such that the generated condensate is exhausted through an exhaust pipe.

There is a problem that the added system increases an entire system price in this conventional art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a low pressure EGR system and the control method thereof having advantages of not forming condensate by controlling a low pressure EGR system, if it is determined that a humidity is high from an atmosphere condition and a driving condition.

In an aspect of the present invention, the low pressure EGR (Exhaust Gas Recirculation) system control apparatus of an internal combustion engine of a vehicle, may include an atmosphere temperature detecting portion that detects atmosphere temperature of a driving region of the vehicle, an air conditioner switch that outputs ON/OFF signal of an air conditioner, a wiper switch outputting ON/OFF signal of a wiper, a control portion that uses the atmosphere temperature to determine a relative humidity and limits an operation of a low pressure EGR system such that condensate may be not formed therein, when the relative humidity may be higher than a predetermined humidity value.

The control portion determines the relative humidity when the atmosphere temperature exceeds a predetermined temperature, wherein the operation of the low pressure EGR system may be limited when the air conditioner switch or the wiper switch outputs ON signal.

The operation of the low pressure EGR system may be limited when the air conditioner switch outputs OFF signal and the wiper switch outputs ON signal.

The control portion may include a data map having monthly average lowest temperature of the driving region, monthly average relative humidity of the driving region, or monthly average accumulated rainfall of the driving region, and limits the operation of the low pressure EGR system, when the mapped relative humidity and the accumulated rainfall respectively exceed a predetermined value.

In another aspect of the present invention, the low pressure EGR system control method, may include comparing an atmosphere temperature with a predetermined temperature, determining a relative humidity when the atmosphere temperature exceeds a predetermined temperature, determining whether the relative humidity may be higher than a predetermined humidity value, limiting an operation of a low pressure EGR system when the relative humidity may be higher the predetermined humidity value.

It may be determined that the relative humidity may be higher than the predetermined humidity value, when the air conditioner or the wiper may be operated.

The low pressure EGR system may be normally operated, when the atmosphere temperature does not exceed the predetermined temperature or the relative humidity may be lower than the predetermined humidity value.

According to an exemplary embodiment of the present invention, a simple control logic is used to prevent a condensate in a low pressure EGR system from being generated such that components durability of a low pressure EGR cooler, an intercooler, and a combustion chamber is improved.

Also, a separate sensor such as a humidity sensor is not applied to save cost such that price competitiveness is improved.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, in the following detailed description, only certain exemplary embodiments of the present invention have been shown and described, simply by way of illustration.

Figure 3:
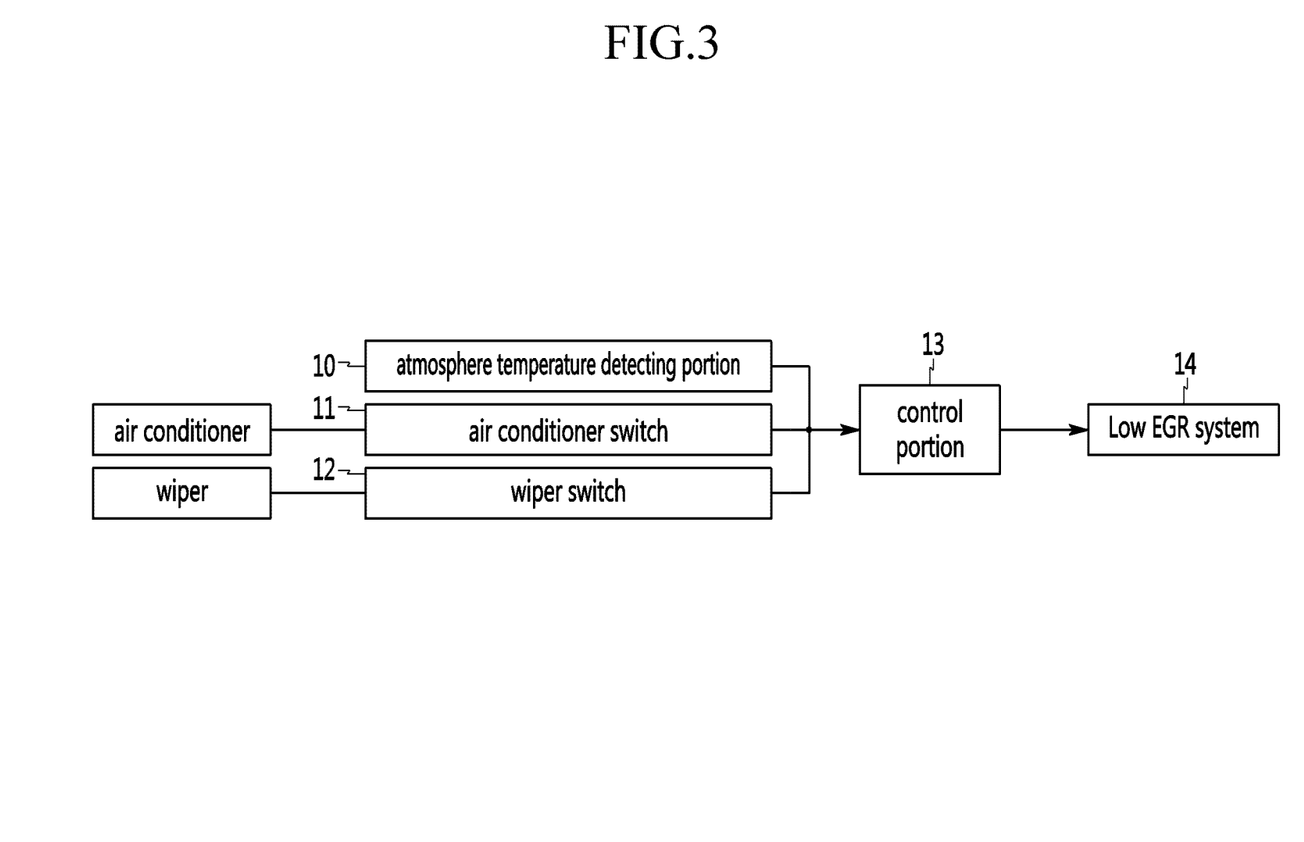
FIG. 3 is a drawing schematically showing a low pressure EGR system control apparatus according to an exemplary embodiment of the present invention.

FIG. 3 is a drawing schematically showing a low pressure EGR system control apparatus according to an exemplary embodiment of the present invention.

Referring to FIG. 3, the present invention, in an exemplary embodiment, includes an atmosphere temperature detecting portion 10, an air conditioner switch 11, a wiper switch 12, a control portion 13, and a low pressure EGR valve 14.

The atmosphere temperature detecting portion 10 detects an atmosphere temperature of a travelling area to transmit the detected signal to the control portion 13.

The air conditioner 11 outputs ON or OFF signal of an air conditioner system that is operated by a driver or automatically to transmit the outputted signal to the control portion 13.

The wiper switch 12 outputs ON or OFF signal of a wiper that is operated by a driver or automatically to transmit the outputted signal to the control portion 13.

The control portion 13 detects an atmosphere temperature/absolute humidity of a travelling area to calculate a relative humidity, and determines whether a humidity is high or not by using an operational ON/OFF condition of the air conditioner 11 and the wiper switch 12.

And, if it is determined that humidity is high from a relative humidity and a driving condition (an operational condition of air conditioner and wiper), the operation of the low pressure EGR system is limited not to generate condensate.

That is, if the relative humidity is higher a predetermined value, the air conditioner is operated, or the wiper is operated, it is determined that the engine is in a high humidity condition. As described above, if it is determined that the engine is operated in a high humidity condition, the low pressure EGR control system is not operated.

Figure 5:
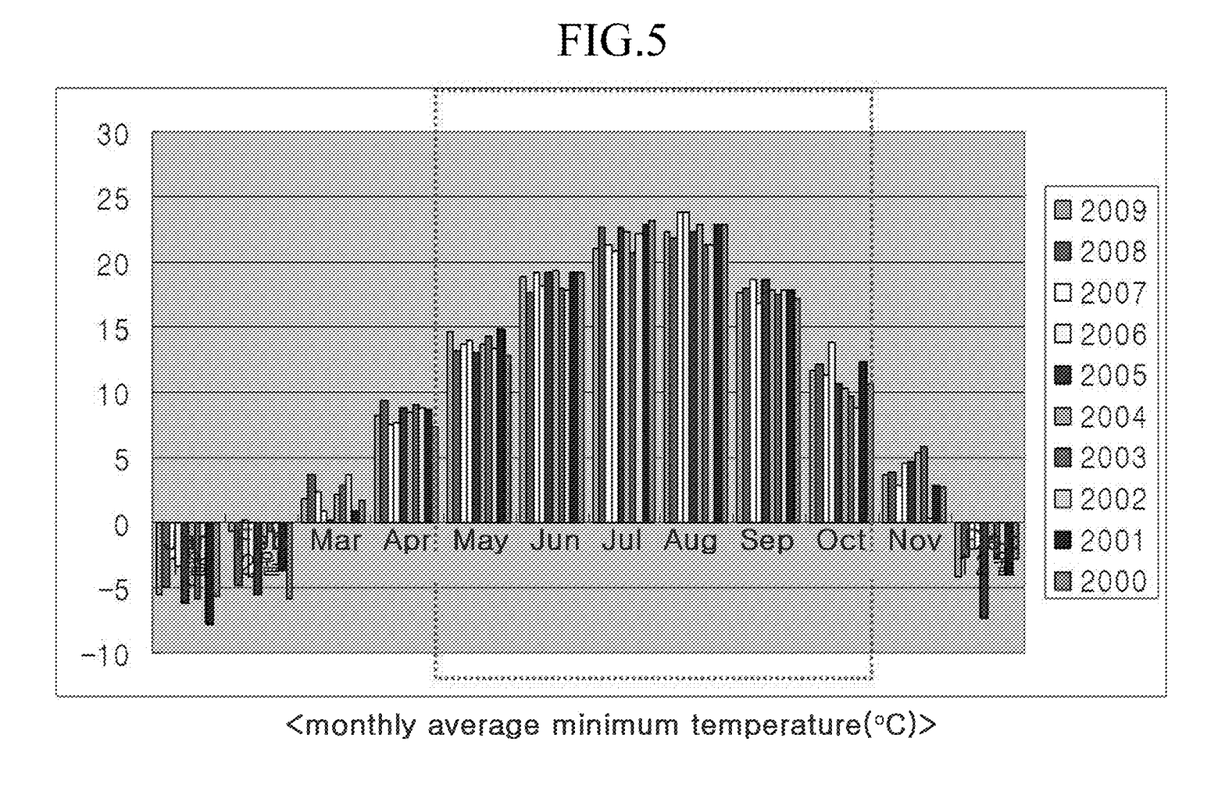
FIG. 5 is a graph showing a monthly average minimum temperature of a specific area according to an exemplary embodiment of the present invention.
Figure 6:
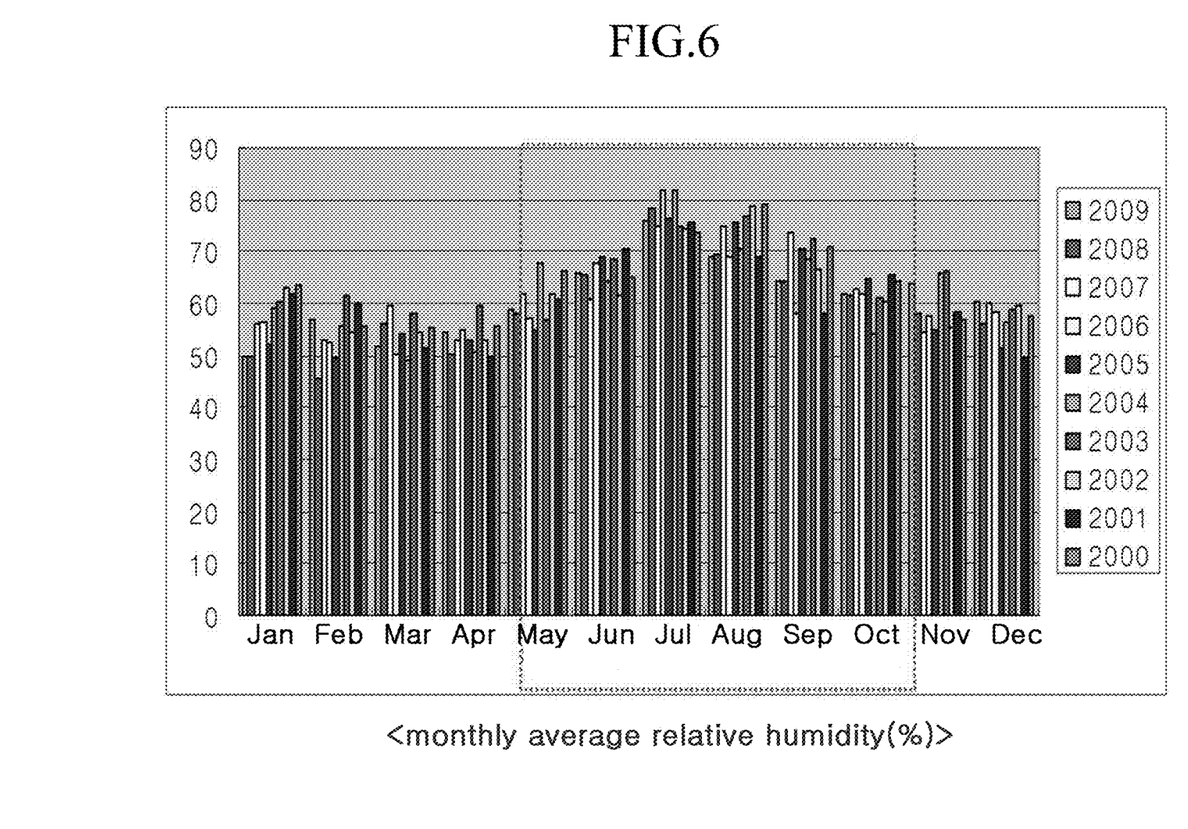
FIG. 6 is a graph showing a monthly average relative humidity (%) of a specific area according to an exemplary embodiment of the present invention.
Figure 7:
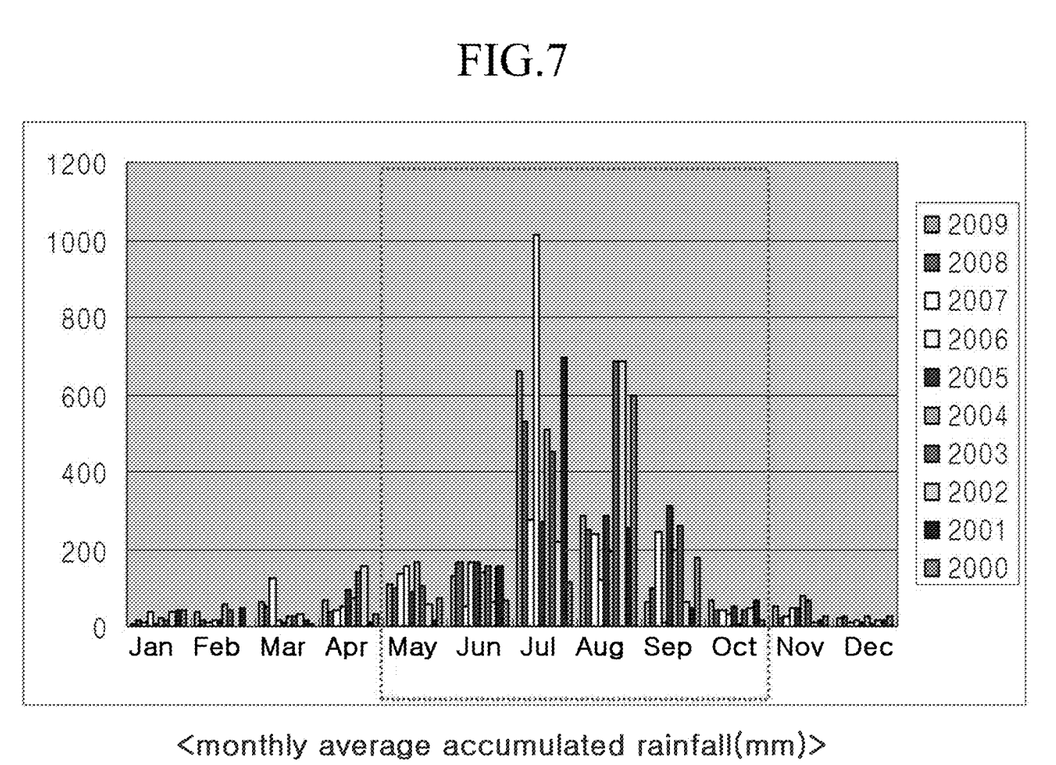
FIG. 7 is a graph showing a monthly average accumulated rainfall (mm) of a specific area according to an exemplary embodiment of the present invention.

Map data including a monthly average minimum temperature (° C.) of a specific area as shown in a FIG. 5, a monthly average relative humidity (%) of a specific area as shown in a FIG. 6, and a monthly average accumulated rainfall (mm) of a specific area as shown in a FIG. 7 are prepared in the control portion 13.

For on example, the map data has information about a Korea and the information can be varied according to a driving area, and therefore the map data can be set with information about relevant area.

The low pressure EGR system 14 is operated according to a duty signal that is transmitted from the control portion 13 to recirculate exhaust gas.

Hereinafter, an operation of a low pressure EGR system according to an exemplary embodiment of the present invention is operated as follows.

Figure 4:
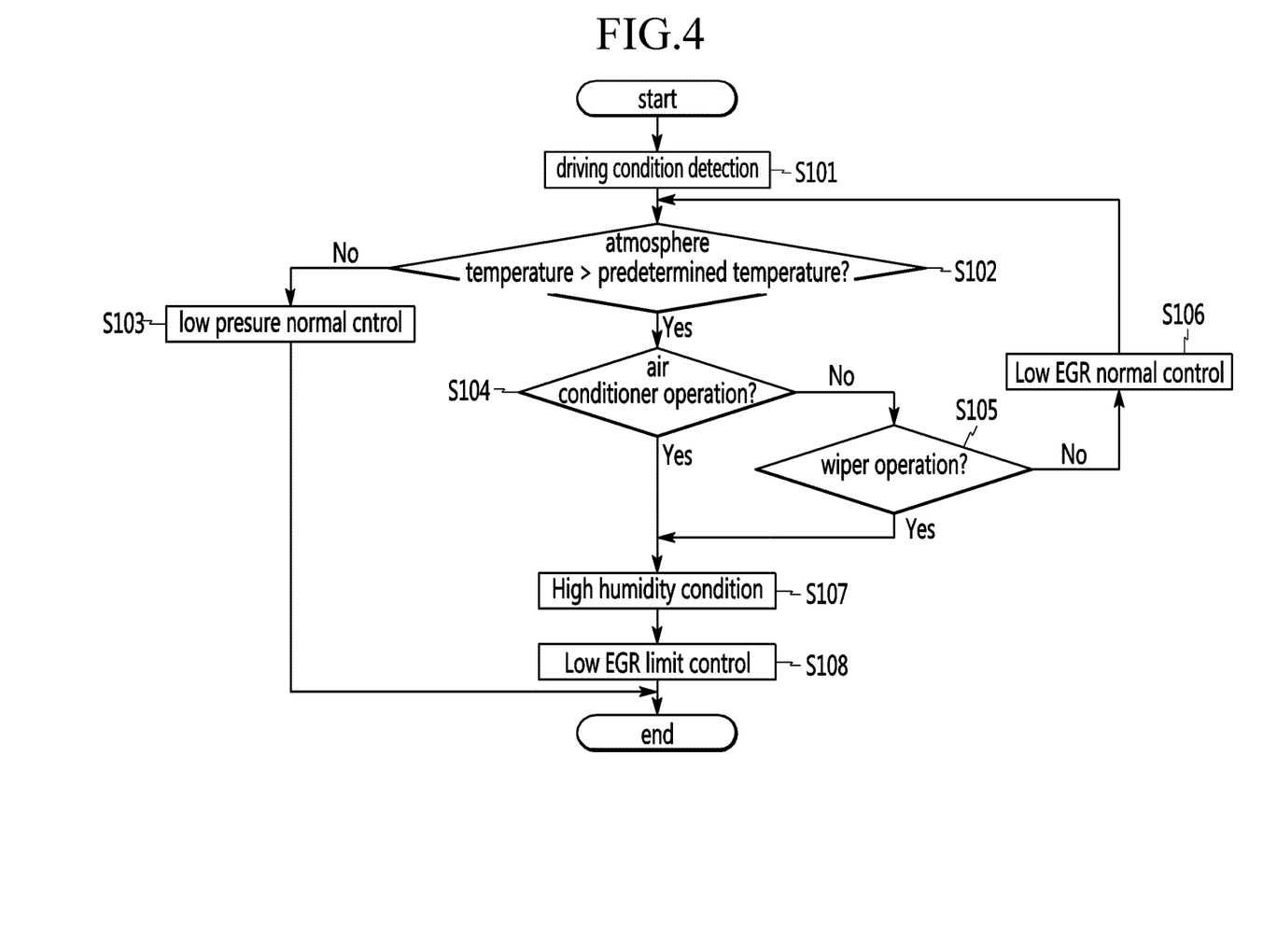
FIG. 4 is a flowchart showing a control procedure of a low pressure EGR system according to an exemplary embodiment of the present invention.

If the internal combustion engine according to an exemplary embodiment of the present invention is operated, the control portion 13 detects driving conditions including an atmosphere temperature through an atmosphere temperature detecting portion 10, an operational ON/OFF condition of the air conditioner 11 and the wiper switch 12 in a S101.

Next, the control portion 13 analyzes the detected data to determine whether the atmosphere temperature is higher than a predetermined temperature in a S102.

The predetermined temperature that is compared with the atmosphere temperature, as shown in a FIG. 5, can be, for example, 15° C., where a relative humidity is considered.

If it is determined that the atmosphere temperature exceeds a predetermined temperature in the S102, a relative humidity is calculated from a relationship of an absolute humidity with the atmosphere temperature in a S102.

For example, as it can be understood from a FIG. 5, if the atmosphere temperature exceeds a predetermined temperature, it can be determined that the vehicle is operated between May to October, and a relative humidity is calculated by applying FIG. 6.

The relative humidity is a ratio to a maximum amount that a vapor can be included in the temperature, if the relative humidity is less than 50%, it feels dry, and if the relative humidity is higher than 75%, it feels humid.

If it is determined that the atmosphere temperature is less than a predetermined temperature in the S102, a relative humidity is low not to form condensate, and therefore the control portion 13 normally operates the low pressure EGR system in a S103.

However, if it is determined that the atmosphere temperature exceeds a predetermined value and a relative humidity is calculated in the S102, it is determined whether the air conditioner is operated or not in a S104.

If it is determined that the air conditioner is operated in the S104, it means that the interior temperature and the humidity are lowered by the air conditioner, and therefore it is determined that the humidity is high in a S107.

Generally, the air conditioner is operated between May and October by a driver or automatically.

Accordingly, the control portion 13 limits an operation of the low pressure EGR system such that the condensate is not formed in a high humid driving condition in a S108.

Also, if the air conditioner is not operated in the S104, it is determined whether a wiper is operated or not in a S105.

If it is determined that the wiper is not operated in the S105, the low pressure EGR system is normally controlled in a S106, and if it is determined that the wiper is operated therein, it is a condition that it's raining, and therefore if the wiper is operated in a condition that the atmosphere temperature is higher than a predetermined temperature, it is determined that the humidity is very high in a S107.

Accordingly, the control portion 13 limits an operation of the low pressure EGR system such that the condensate is not formed in a high humid driving condition in a S108.

In an exemplary embodiment of the present invention, in S102, it may be determined whether the relative humidity is higher than a predetermined humidity value and an operation of the low pressure EGR system may be limited when the relative humidity is higher the predetermined humidity value.

As described above, the atmosphere temperature and the absolute humidity are used to calculate a relative humidity according to an exemplary embodiment of the present invention, if it is determined that an engine is operated in a high humidity condition by detecting the operation of the air conditioner or the wiper, the low pressure EGR system is not operated not to generate the condensate such that the durability of the components that can be damaged by the condensate is enhance to improve reliability thereof.

For convenience in explanation and accurate definition in the appended claims, the terms "high" and "low" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A low pressure EGR (Exhaust Gas Recirculation) system control apparatus of an internal combustion engine of a vehicle, comprising:
    an atmosphere temperature detecting portion that detects atmosphere temperature of a driving region of the vehicle;
    an air conditioner switch that outputs ON/OFF signal of an air conditioner;
    a wiper switch outputting ON/OFF signal of a wiper; and
    a control portion that uses the atmosphere temperature to determine a monthly average relative humidity,
    wherein the control portion includes a data map having monthly average lowest temperature of the driving region, the monthly average relative humidity of the driving region, and monthly average accumulated rainfall of the driving region, and limits the operation of a low pressure EGR system such that condensate is not formed therein, when the monthly average relative humidity and the monthly average accumulated rainfall respectively exceed a predetermined value.

2. The low pressure EGR system control apparatus of claim 1, wherein the control portion determines the relative humidity when the atmosphere temperature exceeds a predetermined temperature.

3. The low pressure EGR system control apparatus of claim 2, wherein the operation of the low pressure EGR system is limited when the air conditioner switch or the wiper switch outputs ON signal.

4. The low pressure EGR system control apparatus of claim 2, wherein the operation of the low pressure EGR system is limited when the air conditioner switch outputs OFF signal and the wiper switch outputs ON signal.

5. The low pressure EGR system control apparatus of claim 1, wherein the operation of the low pressure EGR system is limited when the air conditioner switch or the wiper switch outputs ON signal.

* * * * *